(No Model.)
J. RIEPPEL.
COUPLING DEVICE.
No. 567,614. Patented Sept. 15, 1896.
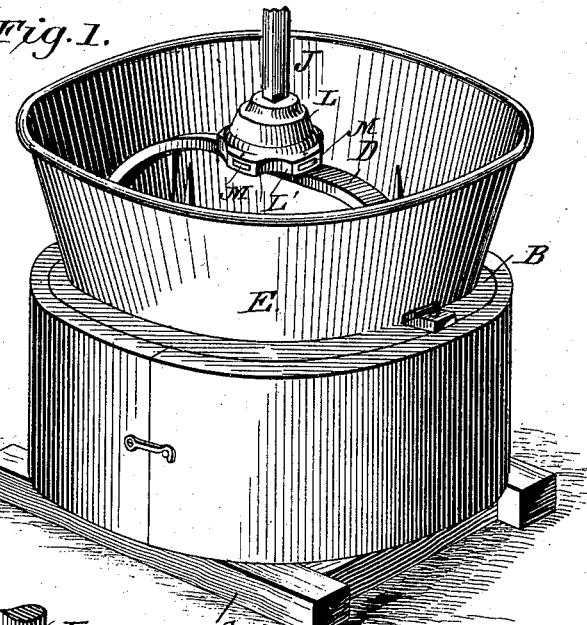
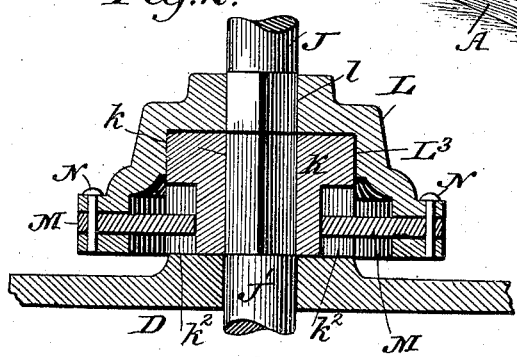
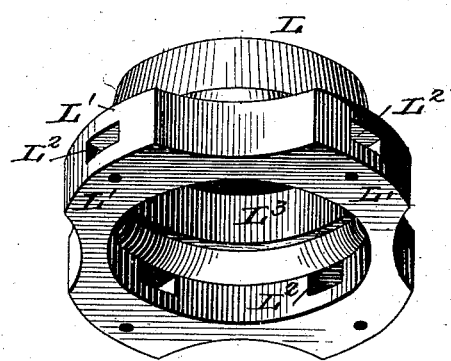
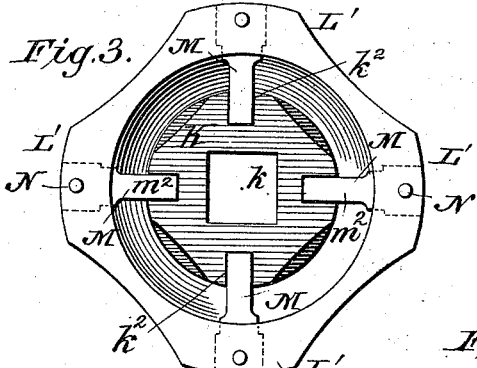
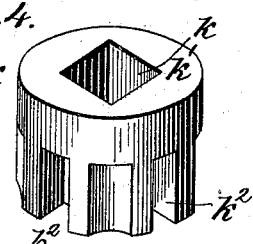
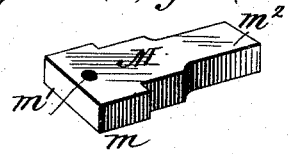
WITNESSES:
H. J. Dieterich
J. Edw. Luckett
INVENTOR
John Rieppel
BY
Fred G. Dieterich & Co.
ATTORNEYS

UNITED STATES PATENT OFFICE.

JOHN RIEPPEL, OF COWANESQUE, PENNSYLVANIA.

COUPLING DEVICE.

SPECIFICATION forming part of Letters Patent No. 567,614, dated September 15, 1896.

Application filed September 23, 1895. Serial No. 563,379. (No model.)

*To all whom it may concern:*

Be it known that I, JOHN RIEPPEL, residing at Cowanesque, in the county of Tioga and State of Pennsylvania, have invented a new and Improved Coupling Device, of which the following is a specification.

My invention relates to improvements in coupling devices more especially adapted for use on bark-shaving mills; and it primarily has for its object to provide a coupling device of this character in which under an unusual strain the coupling member will become disconnected, so as to allow the carrier or rotating holder to come to a standstill when a stone or other obstruction gets into the rim, and thereby avoid the breaking of the rim.

My invention also has for its object to provide a simple and inexpensive locking means for the coupling members which under ordinary strain will serve to hold the said members to rotate together, but in case a stone or piece of metal gets into the rim and an unusual strain is encountered will break and fall out of the way and set, as it were, the carrier to a non-rotating position.

With other minor objects in view my invention consists in certain novel features of construction and peculiar combination of parts, such as will be first described in detail, and then specifically pointed out in the appended claims, reference being had to the accompanying drawings, in which—

Figure 1 is a perspective view of a bark-mill with my improvement applied. Fig. 2 is a vertical section of a portion of the mill, showing my coupling devices applied to the drive-shaft thereof. Fig. 3 is an inverted plan view of the coupling devices. Fig. 4 is a detail view of the coupling members disconnected, and Fig. 5 is a view of one of the break-pins hereinafter referred to.

Referring to the accompanying drawings, A indicates the mill-base, B the rim, D the spider or bearing member for the corner-shaft, E the hopper, and F the carrier, all of which may be of the ordinary construction, it being, however, manifest that while I have shown my coupling devices as applied to a vertical drive-shaft the same is also applicable for use on mills having horizontally-disposed drive-shafts.

By referring more particularly to Fig. 2 it will be noticed the drive-shaft is divided and formed of an upper section J and a lower or mill section J', the meeting ends of which are made non-circular to seat in the non-circular portions $k$ and $l$ of the internal and external coupling members K and L, the construction of which is most clearly shown in Fig. 4.

While I prefer to make the coupling ends of the shaft square or non-circular, such ends and the apertures in the members K and L may be circular and keyed to their respective coupling members K and L.

By referring to Fig. 4 it will be observed the outer coupling member L is in the nature of a hollow hub which is secured to the upper shaft-section J and held to rotate over the spider-bearing, its lower end or base having four (more or less) radial extensions L' L', having horizontal slots $L^2$, which extend through the rim or wall, as shown. The upper portion of the said member L has a contracted vertical chamber $L^3$, in which the upper end $k'$ of the inner member K seats. This member K is made of an even diameter throughout and is of a height to fit within the member L, with its lower end held flush with the bottom of the said member L. This member K has four (more or less) radial notches $k^2$ $k^2$, which extend from the bottom up to the bearing end $k'$.

M M indicate break or lock pins formed of cast metal, which are projected through the slots $L^2$, with their shanks held to project into the notches $k^2$ $k^2$. These pins, one of which is shown in detail in Fig. 5, comprise a head portion $m$, apertured at $m'$, and a reduced or shank portion $m^2$. By reference to Fig. 3 it will be seen the pins M are so constructed that when fitted in place the base of the shank portions $m^2$ will be at a point about in line with the inner rim of the lower end of the member L, which, it will be seen, being of a larger diameter than the member K, provides an intermediate space between the members K and L. The members M are held in place by headed pins N, which extend down through the radial extensions L'.

From the foregoing description, taken in connection with the drawings, it is thought the advantages of my improvement will readily appear.

By providing a number of connecting-points for the pins M one or more may be used, as the work required of the mill may make necessary. As the pins M are made of cast metal and the weak part of such pins is disposed at the greatest leverage-point, it follows that in case of a quick, undue strain on the drive-shaft such pin or pins will snap off, and such snapped-off portion or portions, owing to the open lower end of the notches $k^2$, will fall out of the way and not produce trouble or clogging of the machine, it being manifest that when the lock pin or pins are broken the upper end of the shaft with the member L will rotate on the top of the member K, while such member K and the mill stops.

My coupling means are of a very simple and cheap construction, and owing to the manner in which the pins are held the butt or head portions can be quickly removed and new pins inserted.

Having thus described my invention, what I claim, and desire to secure by Letters Patent, is—

1. A shaft-coupling comprising an outer member, and formed with an upper internal seat portion, and a lower internal space of greater diameter than the seat portion, an inner member adapted to be fixedly connected to the shaft and of a diameter to fit and turn in the upper seat portion of the outer member, and break-pins projected through the lower or enlarged end of the outer member and into engagement with the inner member as specified.

2. In a coupling means as described, the combination with the spider or supporting member D, and the shaft-sections J and J', the shaft J', being held to turn in the member D, of the outer member L, opened at the bottom, held to turn with the shaft-section J, and provided with a contracted internal seat portion $L^3$, of the member K, held to turn with shaft-section J', such member being of a diameter to turn in the seat portion $L^3$, and having at the lower end radial notches $K^2$, and the break-pins M, carried by the outer member, and projected into the notches $K^2$, all arranged substantially as shown and described.

3. A shaft-coupling formed of two members, one held within the other, and one or more breakable pins extending radially through the outer into the inner member, such outer member at the points where the break-pins pass through having an annular enlargement or space surrounding the inner member, whereby an open way is formed between the outer and inner members, for the discharge of the broken-pin member as set forth.

4. A shaft-coupling comprising a hollow outer member having a reduced internal seat portion in its upper end, and one or more inwardly-projecting radial break-pins, and an inner member having a bearing end adapted to fit the internal seat in the outer member, and having one or more radial notches open at the bottom adapted to receive the inner ends of the break-pins as specified.

5. The combination with the hollow coupling member L having one or more radially-disposed horizontal slots in its lower edge, and an internal seat portion at the upper end, of the member K having an upper portion adapted to engage the said seat portion, and one or more radial vertical slots, and break-pins adapted to be loosely fitted in the slots in the outer members having shank portions adapted to fit the radial slots in the member K as set forth.

6. A shaft-coupling of the character stated comprising an inner coupling member having the same diameter its full length, and having a series of radial notches $k^2$, open at the bottom, an outer coupling member open at the bottom having an internal seat to receive the upper portion of the inner member, and having its lower internal portion of a greater diameter than the inner member, whereby an annular space is provided between the two members, and break-pins, detachably connected to the outer member, projected over the said annular space and into the notches $k^2$, as specified.

JOHN RIEPPEL.

Witnesses:
GEORGE SLADE,
W. HOWARD.